(12) United States Patent
Maekawa et al.

(10) Patent No.: US 7,239,715 B2
(45) Date of Patent: Jul. 3, 2007

(54) SPEAKER APPARATUS TO BE MOUNTED ON A VEHICLE

(75) Inventors: Koji Maekawa, Tendo (JP); Tetsuya Onuma, Tendo (JP); Takeshi Ito, Tendo (JP)

(73) Assignees: Pioneer Corporation, Tokyo (JP); Tohoku Pioneer Corporation, Yamagata (JP)

( * ) Notice: Subject to any disclaimer, the term of this patent is extended or adjusted under 35 U.S.C. 154(b) by 379 days.

(21) Appl. No.: 10/870,089

(22) Filed: Jun. 16, 2004

(65) Prior Publication Data

US 2004/0264710 A1 Dec. 30, 2004

(30) Foreign Application Priority Data

Jun. 25, 2003 (JP) .......................... P2003-181528

(51) Int. Cl.
*H04R 25/00* (2006.01)
(52) U.S. Cl. ................. 381/389; 381/302; 381/392
(58) Field of Classification Search ............. 381/86, 381/87, 302, 389, 386, 392; 181/171, 172
See application file for complete search history.

(56) References Cited

U.S. PATENT DOCUMENTS 6,415,036 B1 * 7/2002 Ritter et al. ................. 381/388

FOREIGN PATENT DOCUMENTS

| DE | 38 37 929 A1 | 5/1989 |
|----|---|---|
| DE | 197 01 756 A1 | 7/1998 |
| EP | 1 185 094 A2 | 3/2002 |
| JP | 02-226900 | 9/1990 |
| JP | 5-116570 | 5/1993 |
| JP | 6-3746 | 1/1994 |
| JP | 2002-185887 | 6/2002 |

* cited by examiner

*Primary Examiner*—Curtis Kuntz
*Assistant Examiner*—Tuan Duc Nguyen
(74) *Attorney, Agent, or Firm*—Ladas & Parry LLP

(57) ABSTRACT

A speaker apparatus to be mounted on a vehicle includes a speaker unit and a mounting device. The speaker unit has a frame. The mounting device mounts the frame of the speaker unit on a panel member of a vehicle body. The mounting device includes insulators, which prevent vibration, which is caused by operation of the speaker unit in any direction, from being transmitted to the panel member in any direction.

10 Claims, 4 Drawing Sheets

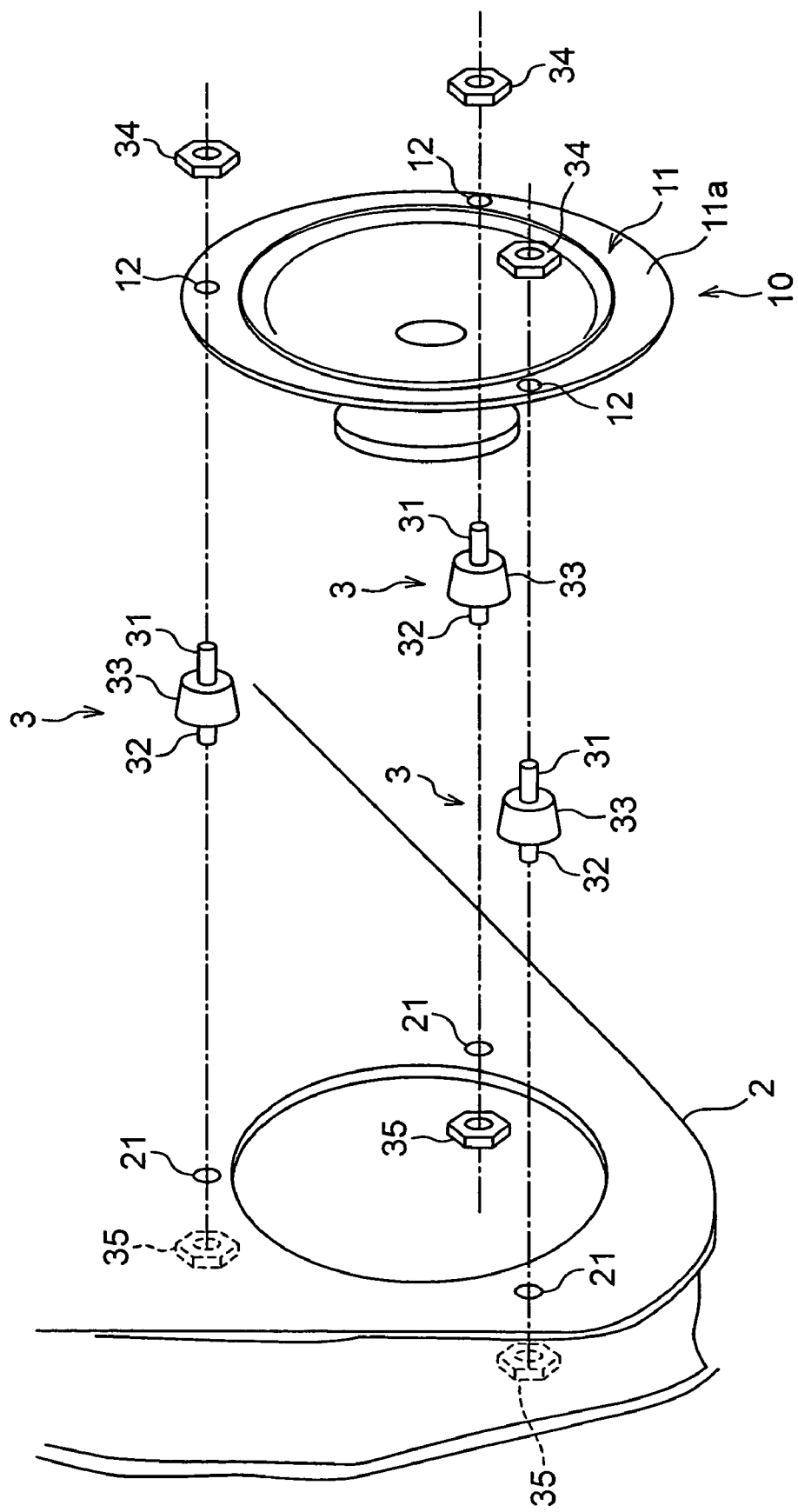

FIG. 2A  FIG. 2B  FIG. 2C
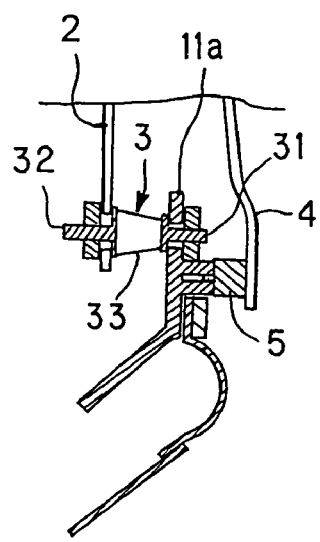
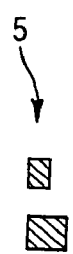
FIG. 3A
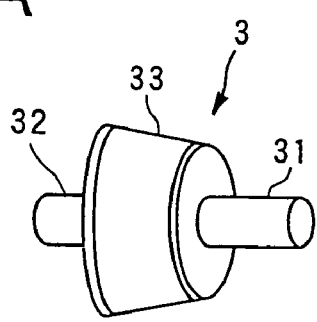
FIG. 3B
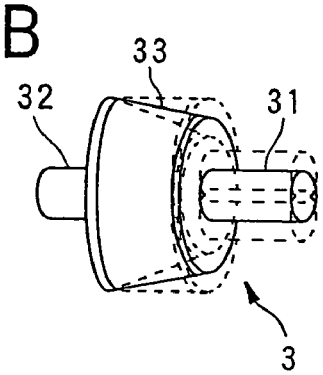
FIG. 3C
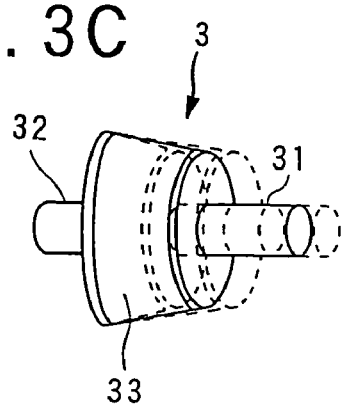

SPEAKER APPARATUS TO BE MOUNTED ON A VEHICLE

BACKGROUND OF THE INVENTION

1. Field of the Invention

The present invention relates to a speaker apparatus including a speaker unit, which is to be mounted on a panel member, particularly an inner panel of a vehicle body.

2. Related Art

There has been known a speaker apparatus including a speaker unit to be mounted on a body of a vehicle, for example, an inner panel thereof.

In the conventional speaker apparatus, the speaker unit is mounted directly on the inner panel of the vehicle by fastening a frame of the speaker unit to the inner panel with the use of screws and hook members as described in Japanese Laid-Open Patent Application Nos. H5-116570 and H6-3746.

However, in the conventional speaker apparatus, the speaker unit is mounted directly on the inner panel of the vehicle with the use of the screws and hook members as mentioned above. As a result, vibration from the speaker unit is transmitted to the inner panel, to generate unfavorable noise from the inner panel, thus causing problems.

In some cases, cushioning members are placed between the frame of the speaker unit and the inner panel, when fastening the frame of the speaker unit to the inner panel with the use of the screws and hook members. Such measures are not to prevent vibration of the speaker unit from being transmitted to the inner panel, but to avoid occurrence of abnormal noise such as "clatter". Even when such measures are taken, vibration from the speaker unit tends to be transmitted to the inner panel, to generate noise having distortion or accompanying with time lag from the inner panel, thus inhibiting a proper musical reproduction.

SUMMARY OF THE INVENTION

An object of the present invention, which was made in view of the above-mentioned problems, is therefore to provide a speaker apparatus to be mounted on a vehicle, which permits a proper acoustic reproduction with high fidelity.

In order to attain the aforementioned object, a speaker apparatus according to one of aspects of the present invention, to be mounted on a vehicle, comprises: a speaker unit comprising a frame; and a mounting device for mounting the frame of the speaker unit on a panel member of a vehicle body; the mounting device comprising insulators, each of the insulators preventing vibration, which is caused by operation of the speaker unit in any direction, from being transmitted to the panel member in any direction.

According to the other aspect of the present invention, the mounting device may further comprise an elastic member through which the speaker unit is to be mounted on an inner trim panel that is placed on an inner side of the panel member of the vehicle body, the elastic member preventing vibration, which is caused by operation of the speaker unit in any direction, from being transmitted to the inner trim panel in any direction.

According to the other aspect of the present invention, the panel member and the inner trim panel each on which the speaker unit is to be mounted by the mounting device, may define an acoustically communication space formed between the panel member and the inner trim panel, the space serving as an acoustic volume on a rear side of the speaker unit.

According to the other aspect of the present invention, the speaker unit may be mounted in a predetermined mounting strength so that a first resonance frequency determined by weight of the speaker unit and the predetermined mounting strength thereof becomes not more than 3000 Hz.

According to the other aspect of the present invention, the first resonance frequency may be set to be smaller than a second resonance frequency, which is a lowest frequency of resonance frequencies that are determined, for an individual of the speaker unit, by a magnetic circuit of the speaker unit, an equivalent mass of the frame, with which the magnetic circuit is surrounded, an equivalent mass of an outer peripheral portion of the frame, and an equivalent compliance of arms of the frame, which bear the equivalent mass of the frame and the equivalent mass of the outer peripheral portion thereof.

According to the other aspect of the present invention, each of the insulators may comprise a resilient section, which is deformable in all the directions.

BRIEF DESCRIPTION OF THE DRAWINGS

FIG. 1 is an exploded perspective view illustrating structural components of a speaker apparatus to be mounted on a vehicle, according to an embodiment of the present invention;

FIG. 2A is a cross-sectional view illustrating a mounting portion of a speaker unit of the speaker apparatus of the present invention; FIG. 2B is a cross-sectional view of an elastic member, illustrating deformation (i.e., expansion and contraction) thereof in the horizontal direction in FIG. 2A; and FIG. 2C is a cross-sectional view of the elastic member, illustrating deformation (i.e., deviation) thereof in the vertical direction in FIG. 2A;

FIG. 3A is a perspective view illustrating an insulator of the speaker apparatus, which is kept in a non-deformed state; FIG. 3B is a perspective view illustrating the insulator that is deformed in a perpendicular direction to the central axis of a fitting shaft; and FIG. 3C is a perspective view illustrating the insulator that is deformed in the axial direction of the fitting shaft;

DESCRIPTION OF THE PREFERRED EMBODIMENTS

Figure 4:
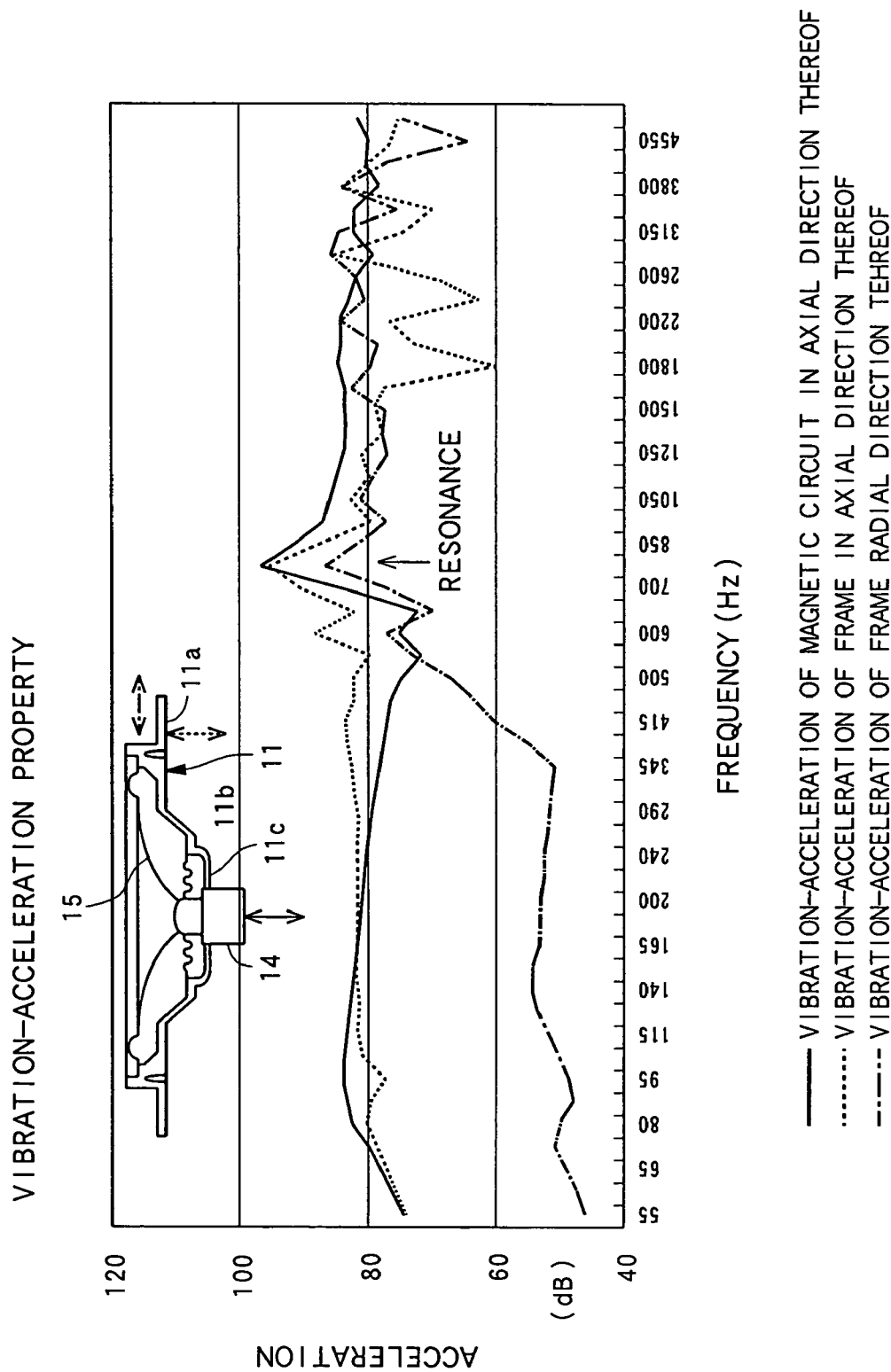
FIG. 4 is a view showing vibration-acceleration properties of a magnetic circuit and a frame for an individual of the speaker unit.

Now, one of the embodiments of a speaker apparatus of the present invention will be described in detail below with reference to FIGS. 1 to 5B.

FIG. 1 is an exploded perspective view illustrating structural components of a speaker apparatus to be mounted on a vehicle, according to an embodiment of the present invention. FIG. 2A is a cross-sectional view illustrating a mounting portion of a speaker unit of the speaker apparatus of the present invention; FIG. 2B is a cross-sectional view of an elastic member, illustrating deformation (expansion and contraction) thereof in the horizontal direction in FIG. 2A;

and FIG. 2C is a cross-sectional view of the elastic member, illustrating deformation (deviation) thereof in the vertical direction in FIG. 2A. FIG. 3A is a perspective view illustrating an insulator of the speaker apparatus, which is kept in a non-deformed state; FIG. 3B is a perspective view illustrating the insulator that is deformed in a perpendicular direction to the central axis of a fitting shaft; and FIG. 3C is a perspective view illustrating the insulator that is deformed in the axial direction of the fitting shaft As shown in FIGS. 1 to 2A, a speaker unit 1 is mounted on a panel member of a vehicle body, for example, a door-inner panel 2 by means of a mounting device, for example, three insulators 3.

Each of the insulators 3 is composed of the first male screw portion 31, the second male screw portion 32 that is placed apart from the first male screw portion 31 so as to be concentric therewith, and an resilient section 33 that connects the first and second male screw portions 31 and 32 to each other, as shown in FIG. 3A. The first male screw portion 31 is to be inserted into a fitting hole 12 formed in a frame 11 of the speaker unit 1, and the second male screw portion 32 is to be inserted into a fitting hole 21 formed in the door-inner panel 2. The first male screw portion 31 is provided at one end thereof with a base disc portion having a predetermined diameter. The second male screw portion 32 is provided at one end thereof with a base disc portion having a predetermined diameter, which is larger than the base disc portion of the first male screw portion 31. The resilient section 33, which is formed of elastic material into a truncated cone, is secured at the opposite end surfaces to the respective base disc portions of the first and second male screw portions 31, 32. Accordingly, the first and second male screw portions 31, 32 are connected to each other not by means of a rigid material, but by means of the elastic material.

The first and second male screw portions 31 and 32 are fastened with the first and second nuts 34 and 35, respectively, as shown in FIGS. 1 and 2A. As a result, the speaker unit 1 is mounted on the door-inner panel 2 so that the resilient sections 33 are held between the frame 11 of the speaker unit 1 and the door-inner panel 2.

The resilient section 33 of the insulator 3 can be deformed to absorb or cut off vibration, which is caused by operation of the speaker unit 1 in any direction, thus preventing it from being transmitted to the door-inner panel 2 in any direction.

Accordingly, the resilient section 33 as shown in FIG. 3A can be deformed in any direction in response to stress due to vibration caused by operation of the speaker unit 1. More specifically, the resilient section 33 can be deformed so that (i) the first and second male screw portions 31 and 32 deviate from each other in the perpendicular direction to the central axis thereof as shown in FIG. 3B, (ii) the first and second screw portions 31 and 32 move close to each other or away from each other along the central axis thereof as shown in FIG. 3C, and (iii) there occurs combination of the deviation as mentioned in item (i) above and the movement as mentioned in item (ii) above.

In addition, an elastic member 5 having a ring-shape is placed between the frame 11 of the speaker unit 1 and an inner trim panel 4 that is placed on the inner side of the door-inner panel 2, as shown in FIG. 2A. The elastic member 5 is secured to the frame 11 of the speaker unit 1 and the inner trim panel 4 through an appropriate securing method, for example by adhesion.

The elastic member 5 serves as a sound insulator to prevent the sound generated by a diaphragm of the speaker unit 1 from escaping. The elastic member 5 has a predetermined resiliency that enables it to be deformed in response to the deformation of the above-mentioned resilient section 33 of the insulator 3. Accordingly, the elastic member 5 does not disturb deformation of the resilient section 33.

In addition, the elastic member 5 is deformed to absorb or cut off vibration, which is caused by operation of the speaker unit 1 in any direction, thus preventing it from being transmitted to the inner trim panel 4 in any direction.

Urethane foam may for example be used as material for forming the elastic member 5. FIG. 2B illustrates the deformation (i.e., expansion (see the lower side in FIG. 2B) and contraction (see the upper side in FIG. 2B)) of the elastic member 5 in the horizontal direction in FIG. 2A. FIG. 2C illustrates deformation (i.e., deviation (see the upper and lower sides in FIG. 2C) of the elastic member in the vertical direction in FIG. 2A.

The speaker unit 1 is secured to the door-inner panel 2 and the inner trim panel 4 through the resilient sections 33 of the insulators 3 and the elastic member 5, respectively. The first resonance frequency may therefore be determined by weight of the speaker unit 1 and mounting strengths by which the speaker unit 1 is mounted to the door-inner panel 2 and the inner trim panel 4, respectively. Here, the general mounting strength of the speaker unit 1 corresponds to the total amount of mounting strengths of the resilient sections 33 of the insulators 3 and the elastic member 5. In the embodiment of the present invention, the mounting strengths by which the speaker unit 1 is mounted to the door-inner panel 2 and the inner trim panel 4, respectively, are set so that the first resonance frequency becomes not more than 3000 Hz.

According to the embodiment of the present invention having the above-described structure, it is possible to absorb or cut off vibration having a frequency, which exceeds the first resonance frequency. Setting the first resonance frequency so as to be not more than 3000 Hz makes it possible to include a fundamental tone of a human being in the frequency band of vibration to be absorbed or cut off, thus preventing the vibration having the frequency band, that can easily be recognized as a sound by the human ear, from being transmitted. It is therefore possible to improve effectively fidelity of a sound to be reproduced.

Figure 5A:
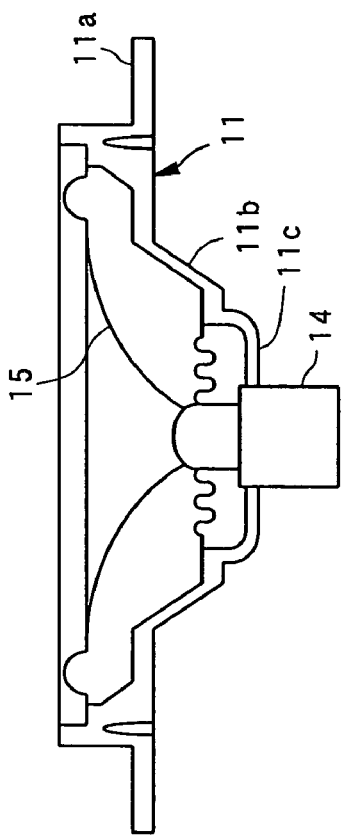
FIG. 5A is a schematic view in cross-section of the speaker unit.

Now, description will be given below of vibration properties of the speaker apparatus according to the embodiment of the present invention, with reference to FIGS. 4 to 5B. FIG. 4 is a view showing vibration-acceleration properties of a magnetic circuit 14 and the frame 11 for an individual of the speaker unit 1. FIG. 4 shows vibration-acceleration of the magnetic circuit 14 in the axial direction thereof (i.e., the direction along which the diaphragm 15 vibrates), vibration-acceleration of a flange portion 11a of the frame 11 in the axial direction thereof, and vibration-acceleration of the flange portion 11a of the frame 11 in the radial direction thereof (i.e., the diametrical direction of the diaphragm 15).

The speaker unit 1 has a resonance frequency in the vicinity of 800 Hz, as shown in FIG. 4. This resonance frequency corresponds to the lowest resonance frequency of resonance frequencies that are determined, for the individual of the speaker unit 1, by the magnetic circuit 14 of the speaker unit 1, an equivalent mass of a magnetic circuit-side peripheral portion 11c of the frame 11, with which the magnetic circuit 14 is surrounded, an equivalent mass of the flange portion 11a of the frame 11, and an equivalent compliance of arms 11b of the frame 11, which bear the equivalent mass of the portion 11c of the frame and the equivalent mass of the flange portion 11a of the frame 11. The above-mentioned resonance frequency will be hereinafter referred to as the "second resonance frequency").

Figure 5B:
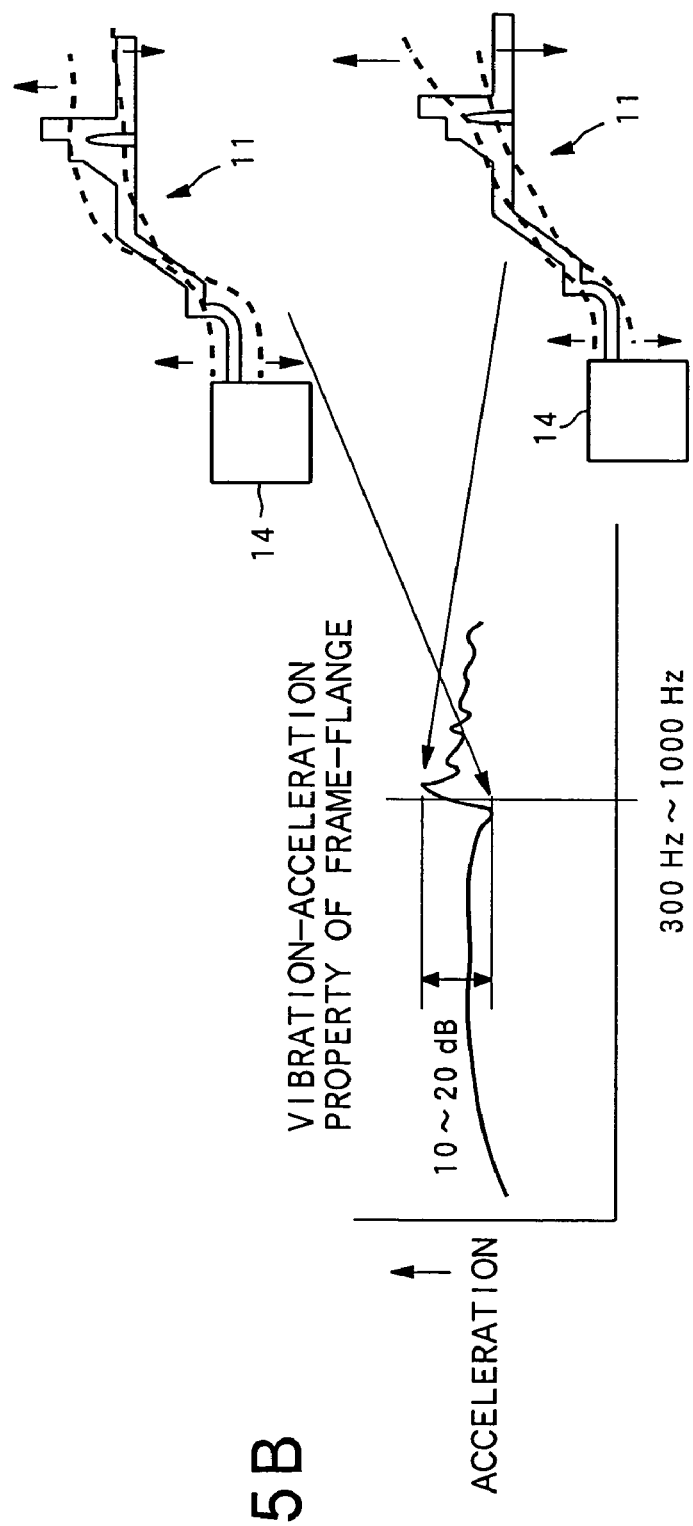
FIG. 5B is a graph showing difference in vibration mode between a higher frequency than the second resonance frequency and a lower frequency than the second resonance frequency.

FIG. 5B is a graph showing difference in vibration mode between a higher frequency than the second resonance frequency and a lower frequency than the second resonance frequency. As shown in FIG. 5B, in the lower frequency band than the second resonance frequency, the magnetic circuit-side peripheral portion 11c of the frame 11, which is placed on the inner side of the arms 11b of the frame 11, and the flange portion 11a of the frame 11, which is place on the outer side of the arms 11b of the frame 11, vibrate in opposite phases.

On the contrary, in the higher frequency band than the second resonance frequency, the magnetic circuit-side peripheral portion 11c and the flange portion 11a vibrate in phase.

It is preferable to make the first resonance frequency lower than the second resonance frequency in the embodiment of the present invention.

More specifically, it is known that the vibration in the radial direction of the flange portion 11a of the frame 11 becomes larger substantially in the frequency band, which is higher than the second resonance frequency. Consequently, making the first resonance frequency lower than the second resonance frequency makes it possible to effectively prevent the vibration in the radial direction of the flange portion 11a of the frame 11 from being transmitted to the vehicle body.

In addition, the gap between the frame 11 of the speaker unit 1 and the inner trim panel 4 is sealed acoustically with the ring-shaped elastic member 5, and a clearance is formed between the adjacent insulators 3, 3 in a space between the door-inner panel 2 and the frame 11 of the speaker unit 1. Accordingly, the speaker unit 1 communicates with the inside of the door-inner panel 2, to utilize the space between the door-inner panel 2 and the inner trim panel 4, as an acoustic volume on the rear side of the speaker unit 1. This makes it possible to increase the acoustic volume, thus improving reproduction performance in the low frequency band.

In the above-described embodiment of the present invention, the insulator 3 is secured to the speaker unit 1 and the door-inner panel 2 by fastening the nuts to the male screw portions. The present invention is not limited only to the above-mentioned securing structure.

In an example case, the insulator 3 may be secured to the door-inner panel 2 by adhering the insulator 3 on the door-inner panel 2, or fitting the insulator 3 into an opening formed in the door-inner panel 2.

According to the present invention as described in detail, the speaker apparatus includes the speaker unit 1 and the mounting device through which the frame 11 of the speaker unit 1 is mounted to the door-inner panel 2 of the vehicle body, and the mounting device includes the insulators 3, which prevent the vibration, which is caused by operation of the speaker unit 1 in any direction, from being transmitted to the door-inner panel 2 in any direction. It is therefore possible to prevent the vibration of the speaker unit 1 from being transmitted to the door-inner panel 2, thus eliminating noise having distortion or accompanying with time lag from the door-inner panel 2. As a result, a proper acoustic reproduction with high fidelity can be ensured.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-181528 filed on Jun. 25, 2003 including the specification, claims, drawings and summary is incorporated herein by reference in its entirety.

What is claimed is:

1. A speaker apparatus to be mounted on a vehicle, comprising:
    a speaker unit comprising a frame; and
    a mounting device for mounting the frame of the speaker unit on a panel member of a vehicle body; said mounting device comprising insulators, each of said insulators comprising
        (i) a first screw portion attached to the frame of the speaker unit,
        (ii) a second screw portion attached to the panel member, and
        (iii) a resilient section for connecting the first and second screw portions to each other, said resilient section having a truncated conical shape tapering from the second screw portion to the first screw portion, said first and second screw portions being spaced from each other through said resilient section, without being connected directly to each other, and each of said insulators preventing vibration, which is caused by operation of said speaker unit in any direction, from being transmitted to said panel member in any direction.

2. The apparatus as claimed in claim 1, wherein: said mounting device further comprises an elastic member through which said speaker unit is to be mounted on an inner trim panel that is placed on an inner side of the panel member of the vehicle body, said elastic member preventing vibration, which is caused by operation of said speaker unit in any direction, from being transmitted to said inner trim panel in any direction.

3. The apparatus as claimed in claim 2, wherein: said panel member and said inner trim panel each on which said speaker unit is to be mounted by said mounting device, define an acoustically communication space formed between said panel member and said inner trim panel, said space serving as an acoustic volume on a rear side of said speaker unit.

4. The apparatus as claimed in claim 1, wherein: said speaker unit is to be mounted in a predetermined mounting strength so that a first resonance frequency determined by weight of said speaker unit and the predetermined mounting strength thereof becomes not more than 3000 Hz.

5. The apparatus as claimed in claim 4, wherein: said first resonance frequency is set to be smaller than a second resonance frequency, which is a lowest frequency of resonance frequencies that are determined, for an individual of the speaker unit, by a magnetic circuit of said speaker unit, an equivalent mass of said frame, with which said magnetic circuit is surrounded, an equivalent mass of an outer peripheral portion of said frame, and an equivalent compliance of arms of said frame, which bear the equivalent mass of said frame and the equivalent mass of the outer peripheral portion thereof.

6. The apparatus as claimed in claim 1, wherein: each of said insulators comprises a resilient section, which is deformable in all the directions.

7. The apparatus as claimed in claim 2, wherein: each of said insulators comprises a resilient section, which is deformable in all the directions.

8. The apparatus as claimed in claim 3, wherein: each of said insulators comprises a resilient section, which is deformable in all the directions.

9. The apparatus as claimed in claim 4, wherein: each of said insulators comprises a resilient section, which is deformable in all the directions.

10. The apparatus as claimed in claim 5, wherein: each of said insulators comprises a resilient section, which is deformable in all the directions.

* * * * *